May 1, 1962    A. T. McCORD ETAL    3,032,388
METHOD OF PURIFYING ZIRCONIUM CHLORIDES
Filed Oct. 10, 1957    3 Sheets-Sheet 1
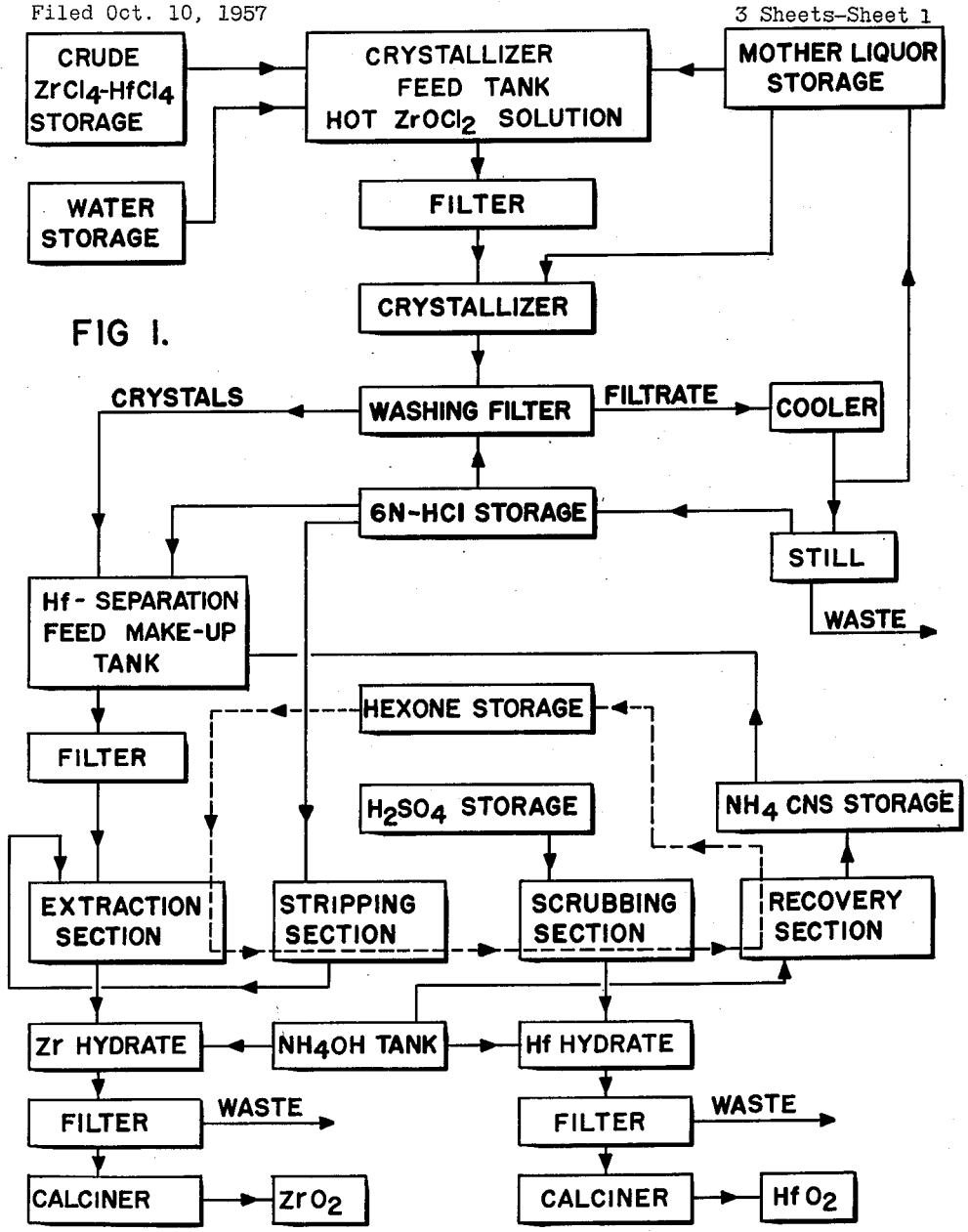
FIG I.
INVENTORS
ANDREW T. McCORD
DONALD R. SPINK
BY
ATTORNEY

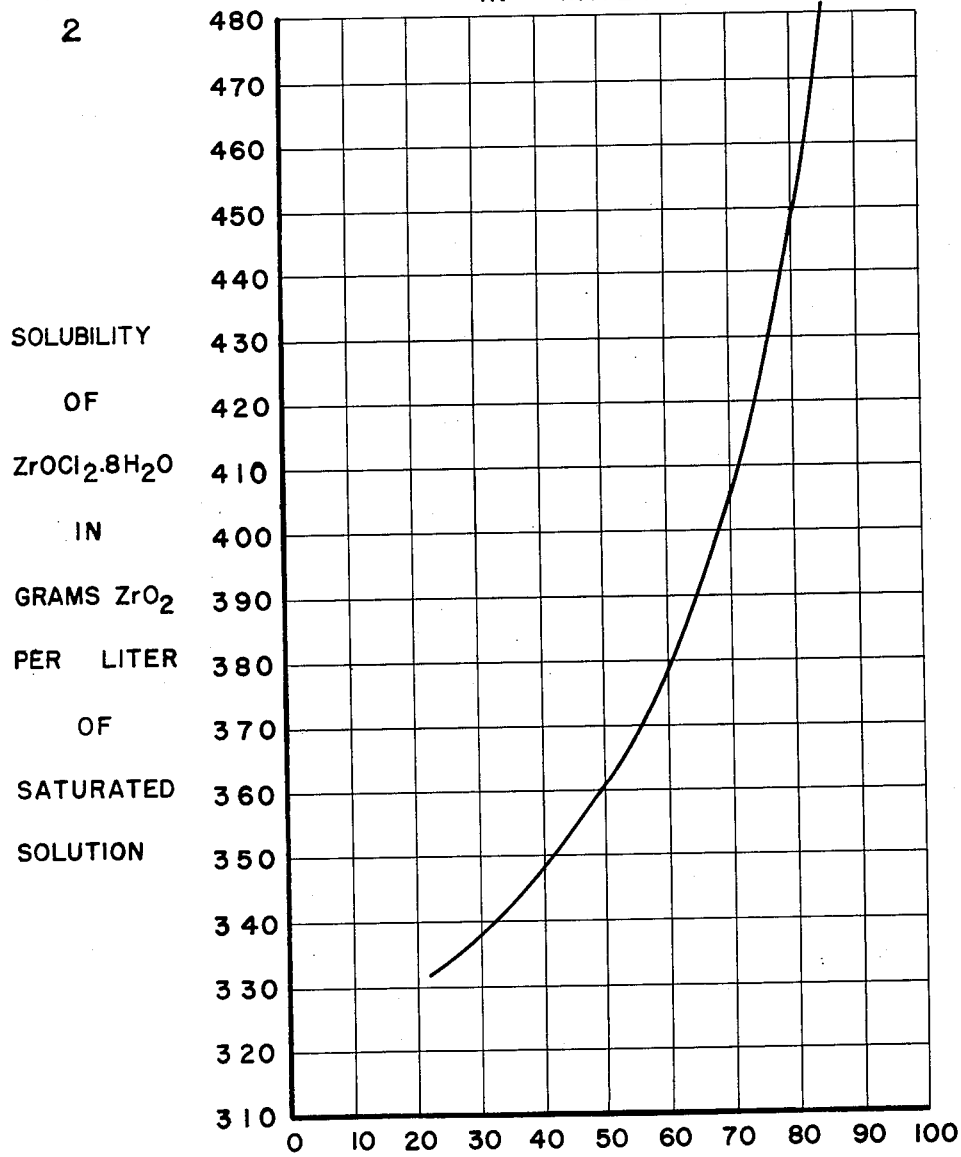

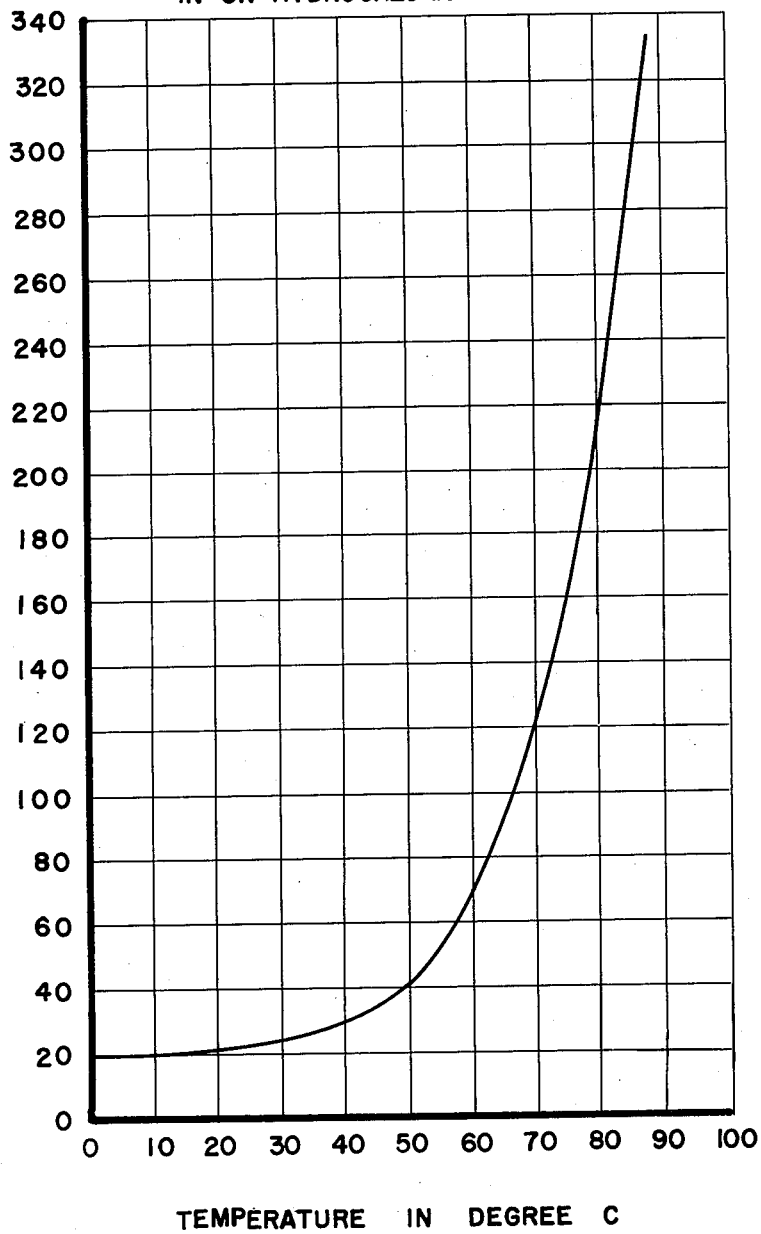

United States Patent Office 3,032,388
Patented May 1, 1962

3,032,388
METHOD OF PURIFYING ZIRCONIUM CHLORIDES
Andrew T. McCord, Snyder, and Donald R. Spink, East Amherst, N.Y., assignors, by mesne assignments, to the United States of America as represented by the United States Atomic Energy Commission
Filed Oct. 10, 1957, Ser. No. 689,333
3 Claims. (Cl. 23—23)

This invention relates to the purification of crude zirconium chloride material and the removal of the hafnium associated therewith. It is especially applicable to the purification of crude zirconium tetrachloride, and the operation of a liquid-liquid extraction system to separate pure zirconium compounds for the making of reactor grade zirconium metal, and to separate pure hafnium compounds for the preparation of hafnium metal for nuclear application.

Crude zirconium tetrachloride, which heretofore has been used as the feed material for the liquid-liquid extraction of hafnium and impurities, normally contains as much as 1% of objectionable impurities plus about 2% hafnium. Prior to the present invention, removal of both the hafnium content and the objectionable impurities has been accomplished by means of the following process. The impure, anhydrous, hafnium-containing zirconium tetrachloride is dissolved in water whereupon considerable heat is generated and some acidity produced in the solution. Ammonium thiocyanate is added to the solution either as a solid or in solution form or both, and some ammonia added to adjust the free acid value of the solution. Satisfactory results are obtained only when very close control is maintained over the composition of the solution. In the course of this operation two side reactions causing difficulties occur. Firstly, a variable amount of insoluble zirconium hydrate is produced, representing a loss of material and a filtration problem; and secondly, the combination of heat and acidity causes some polymerization of thiocyanic acid. Once formed, even after the solution has been clarified, the precipitation of additional polymer continues to occur, and frequently takes place to such an extent that the pipe lines, valves, and equipment become plugged or restricted and consequently increases the maintenance problem and greatly reduces the efficiency of the separation system.

The hafnium is separated from the zirconium by a liquid-liquid extraction process in which the filtered aqueous ammonium thiocyanate solution of zirconyl chloride is passed counter-current to hexone containing thiocyanic acid (2.8 molar) which extracts the hafnium and some zirconium but leaves most of the zirconium in the aqueous phase as a substantially hafnium-free zirconium raffinate. The hafnium-containing solvent is stripped of its zirconium content by washing with hydrochloric acid after which the hafnium is removed from the solvent by scrubbing with a sulphuric acid solution to form an aqueous zirconium-free hafnium sulphate solution, from which the hafnium can be separated by precipitation as hafnium hydrate by the addition of ammonia to the hafnium solution.

To obtain a purified zirconium product, the aqueous zirconium solution (or raffinate) is diluted, mixed with ammonium phthalate, the acidity adjusted to a pH of 1.2 and the solution heated to near boiling. Under these conditions the pure zirconium phthalate becomes insoluble and is precipitated while the majority of the impurities remain in solution. The conditions for this separation of the impurities from zirconium phthalate are extremely critical and continuous close control is imperative for satisfactory results. The resulting zirconium phthalate is filtered and washed and then reacted with ammonia and filtered, followed by a second reaction with additional ammonia and again filtered to obtain a zirconium hydrate which is calcined to the oxide.

The above process of removing impurities and separating the hafnium content from impure zirconium chloride products is fraught with many difficulties. Not only must the entire operation be carried out under extremely close control requiring repeated careful analyses at various stages of the process, but it is essential for obtaining satisfactory results that raw materials of high specification requirements be used. Furthermore, the severity of such a hot precipitation process on the chemical equipment used in the process requires the use of glass lined reactors, rubber-lined rotary drum filters and pumps, all of which add to the overall cost of the operation.

It is an object of the present invention to provide an improved process for extracting impurities from zirconium chloride materials and separating the associated hafnium therefrom.

It is a further object to provide a process of separating zirconium from hafnium and obtaining pure zirconium and hafnium compounds that will permit the utilization of low-grade raw materials.

It is a still further object to provide a process of separating zirconium from hafnium and obtaining pure zirconium and hafnium compounds that will be less severe on the equipment required for handling the operation.

It is a further object of the invention to provide an improved process of purifying zirconium chloride materials and separately recovering the zirconium and hafnium therefrom in which the use of ammonium phthalate or equivalent reagent for extraction of impurities will be obviated.

It is a still further object of the invention to provide a new and improved process of purifying zirconium chloride materials, including the separation of hafnium from the zirconium, which will obviate many of the disadvantages encountered in the processes heretofore utilized.

Other objects and advantages accruing from the present invention will become apparent as the description proceeds.

According to the present invention, the impure zirconium chloride material, such as crude zirconium tetrachloride, is first processed to remove all impurities other than the hafnium, the resulting product being a highly purified zirconyl chloride crystalline material containing the hafnium naturally associated with the zirconium. Following the removal of the other impurities the hafnium-containing, but otherwise purified zirconyl chloride material is subjected to a liquid-liquid extraction treatment to separate the hafnium from the zirconium, and the hafnium and zirconium solutions separately processed to recover the two constituents in purified form. This is accomplished by dissolving the impure zirconium tetrachloride including the impurities contained therein, in water or a solution of hydrochloric acid and crystallizing the hafnium-containing zirconyl chloride from the solution. The solution of anhydrous zirconium tetrachloride in an aqueous medium produces considerable heat, so much so that boiling can occur before saturation is attained. Further, the dissolution in water is accompanied by release of free HCl resulting in a zirconyl chloride solution of high acid normality (4–6 Normal in HCl). At 90° C., a concentrated solution of zirconyl chloride in hydrochloric acid contains free acid (HCl), water, and zirconyl chloride ($ZrOCl_2$). A titration for free acid will indicate a normality of 4 to 6 Normal.

Attempts to separate the zirconyl chloride, especially in large plant size operations, by lowering the temperature of the resulting hot concentrated solution to the point where crystallization becomes effective have proven unsatisfactory because of the clogging of the equipment and difficulties of handling the solidified mass.

The crystallization of zirconyl chloride from a hydrochloric acid solution is autogenic. The first crystals which form, containing 8 molecules of water of crystallization i.e. $ZrOCl_2 \cdot 8H_2O$, cause water to be removed from the system. This automatically produces an increase in concentration of hydrochloric acid which in turn results in a lowered solubility of zirconyl chloride in the solution. Consequently, more $ZrOCl_2 \cdot 8H_2O$ crystals separate, still further reducing the water content and increasing the acid concentration of the solution, and so producing more crystals, etc. The result is that the solution rather suddenly changes to a highly acid, solid mass of crystals and mother liquor.

We have developed a very satisfactory method of effecting crystallization of the zirconyl chloride (properly termed zirconyl chloride octahydrate $ZrOCl_2 \cdot 8H_2O$) from the hot solution so that it can be readily processed and separated from its mother liquor. This is accomplished by introducing the hot solution into a relatively large volume of cold hydrochloric acid solution of high normality. The latter solution in actual operation is preferably saturated with zirconyl chloride—the solution usually being of the mother liquor from previous operations—so that substantially all the hafnium-containing zirconyl chloride of the hot solution is crystallized out leaving the free HCl and the impurities other than the hafnium in solution.

FIGURE 1 of the drawing presents a flow sheet of the process, including not only that part of the process by which a purified zirconyl chloride containing hafnium is obtained, but also that part of the process by which the hafnium is separated from the zirconium in the purified zirconyl chloride and the purified hafnium-free zirconium and zirconium-free hafnium products recovered.

FIGURE 2 is a solubility curve showing the solubility of zirconyl chloride in water at various temperatures; and FIGURE 3 is a solubility curve showing the solubility of zirconyl chloride in 6 Normal hydrochloric acid at various temperatures.

Utilizing an impure zirconium tetrachloride material obtained by the chlorination of a crude zirconium carbonitride furnace product, purification of the material and separate recovery of the hafnium and zirconium in pure form can be effected in accordance with the present invention as follows. The impure zirconium tetrachloride is dissolved in aqueous solution to produce a concentrated, hot solution of zirconyl chloride (zirconium oxychloride) in 5 Normal hydrochloric acid. Zirconium tetrachloride dissolves in water with the generation of considerable heat, forming a hydrochloric acid solution of zirconyl chloride. In actual practice, zirconium tetrachloride has been dissolved in a 2 Normal hydrochloric acid solution to form a solution at 90–95° C. which is almost saturated with zirconyl chloride, such solution containing approximately 1.5 pounds of zirconium per gallon and being approximately 5 Normal in free acid. However, the zirconium tetrachloride can be dissolved in either water or a hydrochloric acid solution, sufficient hydrochloric acid being either initially present in the solution or added during the operation to bring the normality of the resulting hot solution to approximately 5 Normal in free acid and the temperature up to 90° C. The extreme differences in the solubility of zirconyl chloride in hot and cold 6 Normal hydrochloric acid (see FIGURE 3 of the drawing) together with the high solubilities of most of the impurities in 6 Normal hydrochloric acid at any temperature, provide an excellent basis for the effective separation of impurities from the zirconium chloride.

However, in handling a large volume of material, as in the operation of a continuous process on a commercial scale, crystallization of the zirconyl chloride from the hot solution by reducing the temperature of the hot solution to around room temperature has been entirely unsatisfactory because of the congealing of the mass by the autogenic crystallizing action explained earlier herein and resultant clogging of the pipe lines and adherence of the crystalline material to the walls of the equipment. We have, however, found that effective crystallization of the zirconyl chloride can be accomplished in such a way as to eliminate or minimize the problems of handling the material, by forming a slurry to the crystalline precipitate to suitable consistency in a hydrochloric acid solution of high normality. This is done by introducing the hot saturated zirconyl chloride solution into a relatively large volume of cold saturated zirconyl chloride solution of hydrochloric acid of high normality, circulation of the cold saturated solution being maintained constantly. Crystallization of zirconyl chloride is almost instantaneous and complete. Due to the large volume of cold solution, the crystals which are produced in the body of the liquor are prevented from depositing upon the walls of the equipment. The resulting slurry of zirconyl chloride octahydrate crystals is fed into a continuous centrifuge or otherwise processed by means well known in the art to separate the crystals from the mother liquor.

As a result of this cooling and crystallization a heterogeneous system of crystals and mother liquor is obtained. The crystals are hafnium-containing zirconyl chloride octahydrate ($ZrOCl_2 \cdot 8H_2O$) and the mother liquor contains all the original free hydrochloric acid and whatever zirconyl chloride is still soluble. It is to be noted that the crystals which have formed occupy volume and contain water of crystallization. Hence, the mother liquor is reduced in volume, contains less water, but contains all the original free hydrochloric acid. Consequently, it is necessarily stronger in free acid. Our experiments show that a solution of zirconyl chloride at 90° C., containing 4 to 5 Normal free acid and 1 pound per gallon of zirconium, when crystallized, will produce a mother liquor at 30° C. containing 0.1 pound per gallon of zirconium, and approximately 6 to 6.5 Normal free hydrochloric acid. Although it is possible to carry on the same process less effectively using a strong, hot solution of lower normality of free acid, e.g., a 3 Normal free acid content, and crystallize at 30° C. in 3.5 Normal acid, the resulting mother liquor would present the disadvantage of having a higher solubility for the zirconyl chloride. Furthermore, 6 Normal HCl is a constant boiling acid and is therefore, on this basis alone, the most suitable acid concentration to use and easiest to maintain, and recover by a simple distillation. Therefore, optimum conditions and extraction of zirconyl chloride from the mother liquor is secured by use of solutions of higher normality of free acid, as outlined earlier above. It is further noted that all the impurities normally encountered are very soluble in cold 6 Normal hydrochloric acid and are not deposited with, absorbed in, or crystallized with, the zirconyl chloride octahydrate, and can therefore be effectively separated therefrom.

The crystals are washed with pure 6 Normal hydrochloric acid one or more times to remove the last of the impurity-containing mother liquor and the crystalline zirconyl chloride recovered. The mother liquor, which is a 6 Normal solution of hydrochloric acid containing substantially all the impurities other than hafnium present in the original zirconium chloride, continually increases in volume and portions of the mother liquor are periodically withdrawn from the system and distilled to recover 6 Normal hydrochloric acid. The recovered 6 Normal hydrochloric acid is utilized in several places in the process, namely, to wash the crystals free from impure mother liquor, to adjust the acidity of the feed solution in the liquid-liquid separation operation, to extract zirconium from the hafnium raffinate in the separation process, and also to make possible the stripping of ammonium thiocyanate from the zirconium raffinate.

The zirconyl chloride crystals ($ZrOCl_2 \cdot 8H_2O$) obtained from the above purification treatment contain 75–82% $ZrOCl_2 \cdot 8H_2O$, the balance being 6 Normal hydrochloric acid. The crystallization of zirconyl chloride ($ZrOCl_2 \cdot 8H_2O$) from solution, because of the withdrawal of water from the solution as water of crystallization, increases the normality of the hydrochloric acid concentration in the mother liquor. Thus, as pointed out earlier, a hot saturated zirconyl chloride solution in 5 Normal HCl will yield $ZrOCl_2 \cdot 8H_2O$ crystals and a cold saturated $ZrOCl_2$ solution approximately 6 Normal in HCl. The hydrochloric acid can be removed by washing the crystals with a saturated solution of zirconyl chloride, although this is not necessary when the zirconyl chloride crystals are further processed to separate the hafnium content.

The purified, but hafnium-containing, zirconyl chloride crystals obtained from the above operation are dissolved in an aqueous ammonium thiocyanate solution and acidified with hydrochloric acid so as to form a pure feed solution for the separation of the hafnium and the zirconium. The ammonium thiocyanate molarity is maintained at approximately twice the molarity of the zirconium in the pure feed solution because it is estimated that 2 mols of ammonium thiocyanate are required to complex one mol of zirconium. A representative feed solution of zirconyl chloride analyzes to the following specifications:

*Table I*

| | |
|---|---|
| Total metals | 1.17 pounds/gal. |
| Specific gravity | 1.31. |
| Ammonium thiocyanate | 3.12 molar. |
| Free hydrochloric acid | 1.05 Normal. |

Other feed solutions have been made containing as much as 1.5 pounds or more of zirconium per gallon of solution, and comparable separation of the hafnium from the zirconium using solutions containing these higher amounts of zirconium have been effected without difficulty.

The feed solution is usually first passed through a polishing filter for a final clarification of the solution prior to introducing it to the liquid-liquid separation system. The feed solution is then passed through a separating tower counter-current to a flow of hexone (methyl isobutyl ketone) solvent, which is 2 to 3 molar in thiocyanic acid. The hexone-thiocyanic acid solution extracts the hafnium from the aqueous zirconyl chloride solution, leaving a hafnium-free aqueous zirconium raffinate phase. The resulting hafnium-free zirconium raffinate is reacted with ammonia to precipitate the zirconium as zirconium hydrate. The zirconium hydrate is filtered from the aqueous solution, dried and calcined to yield a pure hafnium-free zirconium oxide product.

The organic solvent phase containing the hafnium is washed with hydrochloric acid to remove any residual zirconium which was extracted along with the hafnium, after which it is scrubbed with 5 Normal sulfuric acid to remove the hafnium from the organic solvent as a hafnium sulphate solution. The hafnium sulphate solution is reacted with ammonia to precipitate the hafnium as hafnium hydrate. The hafnium hydrate is filtered, dried, and calcined to yield a pure zirconium-free hafnium oxide product.

Hexone (methyl isobutyl ketone) solvent which is 2 to 3 molar in thiocyanic acid has been found unusually satisfactory for effecting an efficient extraction of the hafnium from the zirconium raffinate aqueous phase with a minimum of cycling. However, other high molecular weight ketones, alcohols, ethers or other organic solvents which are satisfactorily insoluble in water and under selected conditions bring about an extraction of the hafnium from the aqueous phase when processed in a liquid-liquid countercurrent extraction ssytem can be used in place of the hexone.

A typical operation embodying features of the present invention as practiced for the purification of a crude zirconium tetrachloride material is described below. The operation as described can be carried on as a continuing operation in that the mother liquor used for the initial solution of chloride is derived from previous operations of the same process and the hydrochloric acid generated in the operation is recovered for use in the process.

One hundred twenty gallons of water and sixty gallons of mother liquor were mixed in a dissolving tank. The mother liquor contained 0.1 pound of zirconium per gallon as zirconyl chloride and was approximately 6 Normal with respect to hydrochloric acid. To this solution was added 663 pounds of zirconium tetrachloride. The zirconium tetrachloride used was an impure grade of material obtained by the chlorination of a crude zirconium carbonitride furnace product made in turn by the high temperature reduction of zircon sand with carbon. During the addition of the zirconium tetrachloride the temperature of the solution increased from 20° C. to 90° C. The solution in the tank analyzed as follows:

*Table II*

| | |
|---|---|
| Total acid (HCl and Zr) | 9.24 Normal. |
| Total metals (zirconium) | 1.54# per gallon. |
| Free acid (HCl) | 5.64 Normal. |

The main impurities in the solution analyzed as follows, all values being parts per million based on zirconium:

*Table III*

| Al | Cr | Fe | Mg | Mn | Ni | Pb | Ti | V | Si |
|---|---|---|---|---|---|---|---|---|---|
| 440 | <13 | 6,300 | 26 | 13 | 18 | <13 | 400 | 13 | >500 |

The solution also contained a quantity of solids consisting of wood fiber, carbonitride, zircon and other extraneous matter which was removed by passing the hot zirconyl chloride solution through a filter as it was removed from the solution tank.

A glass lined crystallizing tank of 200 gallons capacity was filled with mother liquor, i.e. liquor from which previous batches of zirconyl chloride had been crystallized and the same in character as the mother liquor used for dissolving zirconium tetrachloride in the initial solution operation. Hot zirconyl chloride solution from the solution tank was conducted to the crystallizing tank at the rate of 2 gallons per minute. As the hot solution mixed with the cold mother liquor, crystallization occurred and the crystals produced were thrown down to the bottom of the tank and carried out through a bottom outlet to a centrifuge where they were separated from the mother liquor. It was found necessary to heat the line from the dissolving tank to the crystallizing tank so as to maintain a temperature of at least 85° C. in the liquor; this prevented cooling and crystallization in the line during the operation. This was done by means of an insulated low pressure steam coil installed about the line.

Simultaneously with the introduction of hot zirconyl chloride solution into the crystallization tank and withdrawal of the slurry of crystals from the bottom of the tank, cold mother liquor obtained from the centrifuging operation was passed through a cooler and introduced into the crystallizing tank at the rate of about 20 gallons per minute, thereby producing a volumetric ratio of about 10 gallons of the cold solution to about 1 gallon of hot solution.

The temperature in the crystallizing tank was maintained between 25 and 31° C. for satisfactory operation.

A 6 cu. ft. centrifuge was completely loaded with zirconyl chloride crystals in about 1 hour at normal crystallization rates for the present operation. All flow of material was stopped when the centrifuge was loaded and, to prevent blockage by crystal formation, all hot lines were drained and washed out. In plant operation, this would not be necessary as continuous operation could be maintained by the use of two or more centrifuges. After being loaded, the centrifuge was operated at low speed for ten minutes without any feed entering the basket. The crystals were then sprayed with 13–15 gallons of pure 6 Normal hydrochloric acid recovered from previous operations. After a ten minute interval, a second 13–15 gallon spray of hydrochloric acid was given the crystals after which the centrifuge was operated at high speed for an additional ten minutes. The centrifuge was stopped and a batch of about 370–400 pounds of crystals removed. The operation was repeated to obtain further batches of crystals. At the end of the run, all the crystals remaining in the crystallizing tank were transferred to the centrifuge by recirculating additional mother liquor to the crystallizing tank. A total of 1008 pounds of washed zirconyl chloride crystals were collected in the operation.

During the operation the volume of mother liquor increased steadily. All the soluble impurities in the original zirconium tetrachloride accumulated in the mother liquor. A typical analysis of the mother liquor was:

Total acid_____ 6.19 Normal.
Total metals as zirconium_____ 0.1 pound/gallon.

*Table IV*

[Parts per million or percentage of impurities in the mother liquor based on zirconium]

| Al | Cr | Fe | Mg | Mn | Ni | Pb | Ti | V | Si |
|---|---|---|---|---|---|---|---|---|---|
| 2,500 | 50 | 1% | 180 | 75 | 200 | 13 | 0.5% | 500 | 400 |

To maintain an operative system, therefore, the mother liquor must be withdrawn from the system either continuously or periodically at the same rate at which it accumulates. In the above described operation, 50 gallon batches of mother liquor were removed at intervals and distilled in a glass lined still, the distillate being very pure, approximately 6 Normal hydrochloric acid which was used to wash the zirconyl chloride crystals in the centrifuge and at other places in the process. The still residue, corresponding to about 8% of the material fed to the still when cold, crystallized and became almost solid. These crystals were separated from the liquor and washed with 6 Normal hydrochloric acid. The washed crystals were of sufficient purity to be returned to the dissolving tank. In actual operation the still residue can be treated to recover the crystals and redistilled to recover the acid, thus yielding at least a 99% recovery of hydrochloric acid and zirconium values.

The average analysis of the purified zirconyl chloride crystals obtained from the above operation, in parts per million based on the zirconium content, was as follows:

*Table V*

| Al | Fe | Si | Cr | Mg | Mn | Ni | Pb | Ti | V |
|---|---|---|---|---|---|---|---|---|---|
| <20 | <32 | 175 | <13 | <13 | <13 | <13 | <13 | <13 | <13 |

Using the purified zirconyl chloride crystals obtained from the above operation, the process of effecting a separation of the zirconium from the hafnium and obtaining each in purified form was carried out as follows.

A pure hafnium-containing zirconyl chloride feed solution having the following specifications was prepared:

Total metals_____ 1.17 pounds/gallon.
Specific gravity_____ 1.31.
Ammonium thiocyanate_____ 3.12 molar.
Free acid_____ 1.05 Normal.

The feed solution was prepared from the following raw batch of materials:

220 gal. of pure zirconyl chloride solution, 1.98 pounds Zr/gallon
152 gal. of stock ammonium thiocyanate solution at 8.43 molar
29 gal. 9.8 Normal hydrochloric acid
250 pounds of pure zirconyl chloride crystals The feed solution was passed through a separation tower countercurrent to a flow of hexone organic solvent approximately 2.6 molar in thiocyanic acid, the hafnium being extracted from the aqueous phase by the organic solvent solution. The resulting zirconium raffinate aqueous phase after treatment had an analysis expressed in parts per million, based on zirconium, as follows:

| | Hf | Al | Cr | Fe | Mg | Mn | Ni | Pb | Si | Ti | V |
|---|---|---|---|---|---|---|---|---|---|---|---|
| Zr raffinate | <30 | <20 | <13 | 32 | <16 | <13 | <13 | 13 | 65 | 20 | <13 |

This material is so pure that separation of the zirconium from the trace impurities is unnecessary. Consequently the resulting hafnium-free zirconium raffinate was then treated with ammonia to precipitate the zirconium as zirconium hydrate. The zirconium hydrate was then filtered, dried and calcined to yield a pure hafnium-free zirconium oxide.

The organic solvent containing the hafnium was washed with previously recovered hydrochloric acid to remove any residual zirconium, after which the hafnium was removed as a solution of hafnium sulphate by scrubbing the solvent with 5 Normal sulphuric acid. The resulting hafnium sulphate solution was treated with ammonia to precipitate hafnium hydrate which was removed from solution by filtration, followed by drying and calcining to produce a pure hafnium oxide product.

The hafnium raffinate solution after treatment had a typical analysis in parts per million, based on hafnium, except where expressed in percentage, as follows:

| | Hf | Al | Cr | Fe | Mg | Mn | Ni | Pb | Si | Ti | V |
|---|---|---|---|---|---|---|---|---|---|---|---|
| Hafnium raffinate | >99% | 85 | 20 | 1,600 | 65 | <32 | <13 | 20 | 300 | 500 | 13 |

Having described the invention in detail, it is desired to claim:

1. A process for removing hafnium values and other metallic impurity values from an impure zirconium tetrachloride material which comprises: first removing said other metallic impurity values by dissolving said material to form a hot, about 5 Normal hydrochloric acid solution saturated with zirconyl chloride and having a temperature of about 90° C. to prevent crystallization of said zirconyl chloride, mixing said hot solution with a cold, about 6 Normal hydrochloric acid solution saturated with zirconyl chloride and having a temperature substantially lower than 85° C. to cause autogenic precipitation of zirconyl chloride crystals substantially free from said other metallic impurity values at a temperature ranging from about 25° C. to about 31° C., said cold hydrochloric acid solution having a volume about 10 times larger than the volume of said hot solution, and separating said zirconyl chloride crystals from their mother liquor; subsequently removing said hafnium values from the zirconium values by a liquid-liquid extraction treatment comprising dissolving said zirconyl chloride crystals in an aqueous solution of ammonium thiocyanate having a molarity about twice the molarity of the zirconium in solution and acidified with hydrochloric acid to a solution normality of about 1 in free hydrochloric acid so as to form a pure feed solution, contacting said pure feed solution with methyl iso-butyl ketone which is about 2 to about 3 molar in thiocyanic acid, and recovering an aqueous zirconium raffinate substantially free from said hafnium values.

2. A process for removing hafnium values and other metallic impurity values from an impure zirconium tetrachloride material which comprises: first removing said other metallic impurity values by dissolving said material to form a hot, about 3 to about 6 Normal hydrochloric acid solution of concentrated zirconyl chloride and having a temperature ranging from about 85° C. to about 90° C. to prevent crystallization of said zirconyl chloride, mixing said hot solution with a cold, about 3.5 to about 6.5 Normal hydrochloric acid solution of zirconyl chloride and having a temperature substantially lower than 85° C. to cause autogenic precipitation of zirconyl chloride crystals substantially free from said other metallic impurity values, said cold hydrochloric acid solution having a volume substantially larger than the volume of said hot solution, and separating said zirconyl chloride crystals from their mother liquor; subsequently removing said hafnium values from the zirconium values by a liquid-liquid extraction treatment comprising dissolving said zirconyl chloride crystals to form an aqueous acidic pure feed solution, contacting said pure feed solution with an organic solvent, and recovering an aqueous raffinate of one of said zirconium and hafnium values substantially free from the other of said zirconium and hafnium values.

3. A process for removing hafnium values and other metallic impurity values from an impure zirconium tetrachloride solution which comprises: first removing said other metallic impurity values by dissolving said material to form a hot about 3 to about 6 Normal hydrochloric acid solution of zirconyl chloride and having a temperature of at least about 85° C. to prevent crystallization of said zirconyl chloride, mixing said hot solution with a cold, about 3.5 to about 6.5 Normal hydrochloric acid solution having a temperature substantially lower than 85° C. to cause autogenic precipitation of zirconyl chloride crystals substantially free from said other metallic impurity values, said cold hydrochloric acid solution having a volume substantially larger than the volume of said hot solution, and separating said zirconyl chloride crystals from their mother liquor; subsequently removing said hafnium values from the zirconium values by a liquid-liquid extraction treatment.

References Cited in the file of this patent

UNITED STATES PATENTS

| 1,376,161 | Pugh | Apr. 26, 1921 |
| 2,384,428 | Osjasz | Sept. 11, 1945 |
| 2,938,769 | Overholser et al. | May 31, 1960 |

FOREIGN PATENTS

| 465,605 | Great Britain | May 10, 1937 |

OTHER REFERENCES

Leaders, A.E.C. Publication Y–553, January 20, 1950 (17 pages).

Overholster et al., in A.E.C. Publication Y–477, September 9, 1949 (35 pages).

Mellor: "Comprehensive Treatise on Inorganic and Theoretical Chemistry," vol. 7, Longmans, Green and Co., New York, 1927, pages 168–169 and 172.

Shipley et al.: A.E.C. Publication Y–449, July 22, 1949, 10 pp.

Ramsey et al.: A.E.C. Publication Y–817, October 12, 1951 (41 pages).

Mellor: "Comprehensive Treatise on Inorganic and Theoretical Chemistry," 1927, vol. 7, pages 145 to 147 inclusive.